Feb. 16, 1954 R. D. SMITH Re. 23,783

DEMOUNTABLE TIME SWITCH UNIT FOR UNIVERSAL USE

Original Filed June 20, 1945 3 Sheets-Sheet 1

INVENTOR Raymond D. Smith

DEMOUNTABLE TIME SWITCH UNIT FOR UNIVERSAL USE

Original Filed June 20, 1945 3 Sheets-Sheet 2

INVENTOR

Raymond D. Smith

DEMOUNTABLE TIME SWITCH UNIT FOR UNIVERSAL USE

Original Filed June 20, 1945 3 Sheets-Sheet 3

INVENTOR

Raymond D. Smith

Reissued Feb. 16, 1954

Re. 23,783

UNITED STATES PATENT OFFICE 23,783

DEMOUNTABLE TIME SWITCH UNIT FOR UNIVERSAL USE

Raymond D. Smith, Easton, Conn.

Original No. 2,508,896, dated May 23, 1950, Serial No. 600,557, June 20, 1945. Application for reissue December 14, 1950, Serial No. 200,820

32 Claims. (Cl. 200—36)

Matter enclosed in heavy brackets [ ] appears in the original patent but forms no part of this reissue specification; matter printed in italics indicates the additions made by reissue.

This invention relates to time switches combined with or incorporated within a time-of-day telling clock and particularly to electric circuit-making-and-breaking mechanism operated or governed by clockwork.

Time switches of this type commonly consists of a time giving mechanism or time movement mechanically so associated with circuit switching electric contacts that such contacts are caused automatically to make and break one or more electric circuits at preset times of day. In such time switches where the same clockwork not only operates or governs an electric switch but also drives conventional clock hands in front of a conventional clock face for telling time of day, it has been proposed in my former U. S. Patents Nos. 2,004,137 and 2,032,774 to provide separate indicators adjustably settable around the circularly arranged regular time-of-day markings on the clock face for registering thereby the time of day at which the circuit making and breaking actions automatically will take place. Mechanically, such indicators may be connected with the switch operating mechanism so as to assume registering positions with respect to the clock face indicia that shall accord accurately with the setting of inside trips or any other kind of working elements which determine at what point in the running of the clock movement the automatic electric switch actions shall be caused to take place.

The present invention aims to incorporate such distinctive kind of switch action, time indicator means as are proposed in my former said patents in a novelly organized form of appliance that may be characterized as a demountable armored unit having distinct and important advantages over previously known kinds of time switches. This novel structural form of combined clock and time switch unit opens the way to radical departure from long established but costly and inefficient practices of manufacturing and merchandising time switches for many fields of use. Examples of such use are: the time control of cooking in electric and gas ranges; timed automatic turn-on and turn-off of radio receiving sets for catching desired broadcasting programs; the automatic shifting of temperature setting in house heating controls at regular preset times between lowered night heat and normal daytime heat; the timed automatic defrosting of electric refrigerators on a regular daily schedule; the automatic turning on and off of store window display lights, bill board and outdoor advertising lights, as well as the illumination of public quarters automatically at preset times of day or night.

The present improvements aim to solve these former problems by providing a small, unitary, armor-encased time switch incorporating a time-of-day telling clock with its crystal protected clock face, which shall be attachable in readily demountable manner in flush relation to a sight apertured panel or other form of upright support wall.

Other objects of the present invention have to do with structural and functional improvements in an organization of working parts based on principles originating in my aforesaid issued patents. Among such are devices that permit back-setting as well as forward setting of certain electric switch time setting controls and indicators; devices which change the program of automatic circuit switching action from a twelve hour cycle to a twenty-four hour cycle, controls additional to the electric switch setting controls exposed for manipulation at the front of the unit for actuating the clock-work as for restarting a non-self starting synchronous clock motor when its interrupted supply of current is resumed or resetting the clock hands to a correct time of day, devices to stay the time setting indicators and controls against unintentional displacement from their set positions, and devices to enable a time-switch of the character concerned to switch current automatically from one circuit to another.

The foregoing and other objects of the invention are more fully referred to in the following description of a preferred embodiment of the invention in which description reference is had to the appended drawings wherein.

Figure 1:
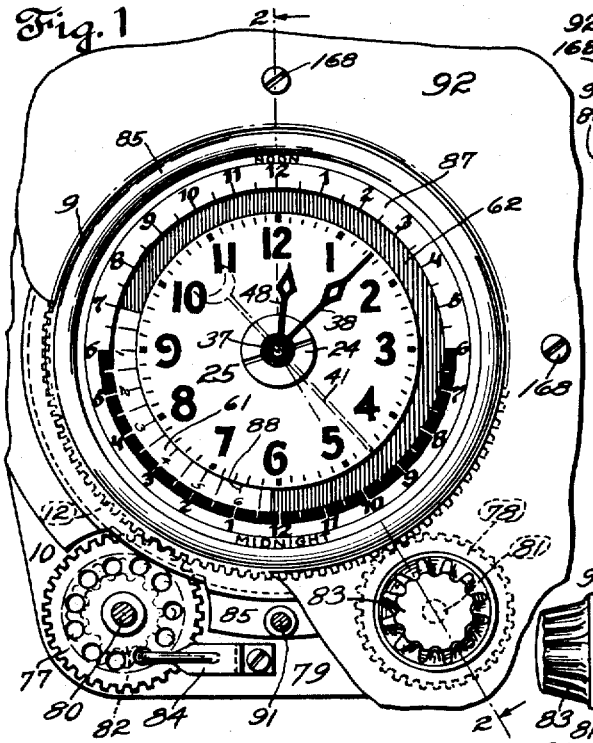
Fig. 1 is a front view of my improved clock switch unit mounted on a vertical panel, a part of which is shown as broken away to expose more of the unit than in practice would appear.
Figure 2:
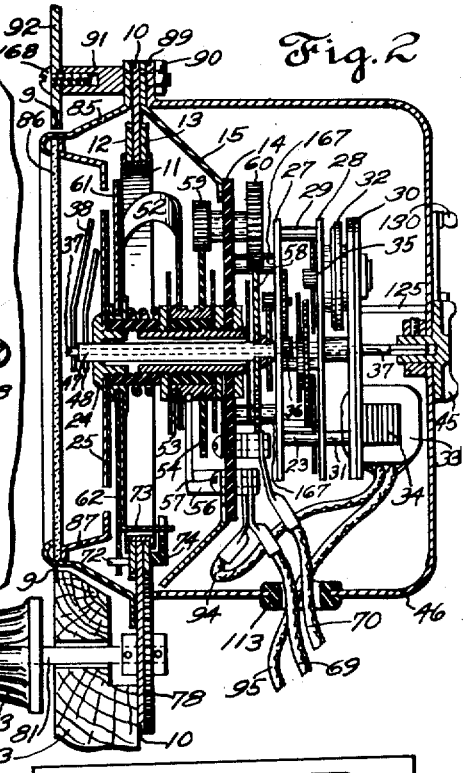
Fig. 2 is a view looking from the right at Fig. 1, some of the parts being shown as taken in section on the planes 2—2 in Fig. 1, a different thickness of support panel being indicated at the top than is indicated at the bottom for purposes of illustration.
Figure 3:
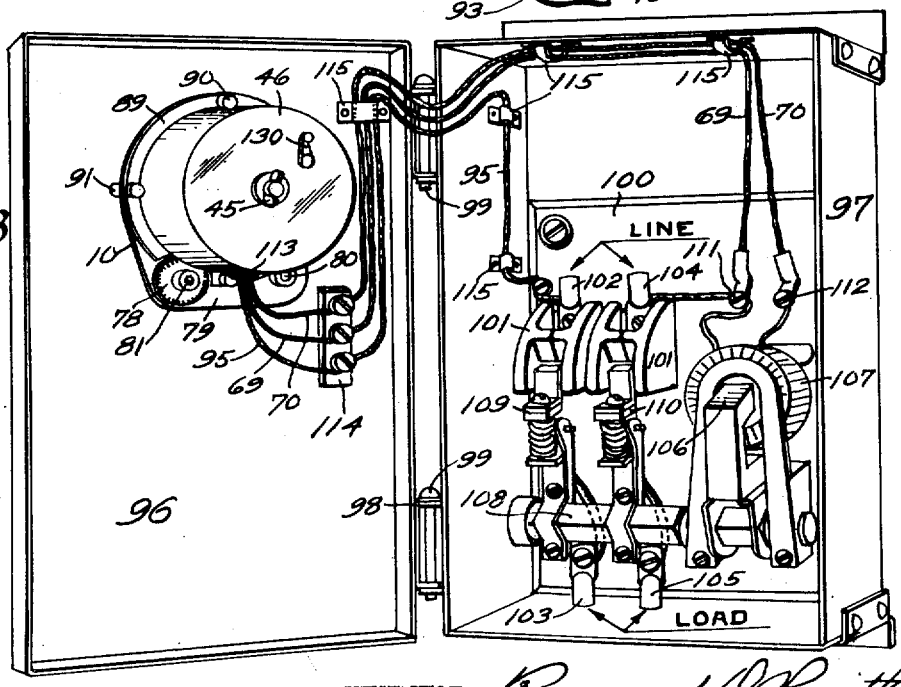

Fig. 3 shows a useful application of the unit of Figs. 1 and 2, wherein the same is mounted against the inner face of a hinged cover giving access to a cabinet containing a magnetically operated switch, in the upper part of which cabinet there is room to accommodate the clock switch unit when the cover of the cabinet is swung closed, flexible electric wires connecting the clock switch unit and the magnetic switch while permitting the cabinet cover to be opened and closed.

Figure 4:
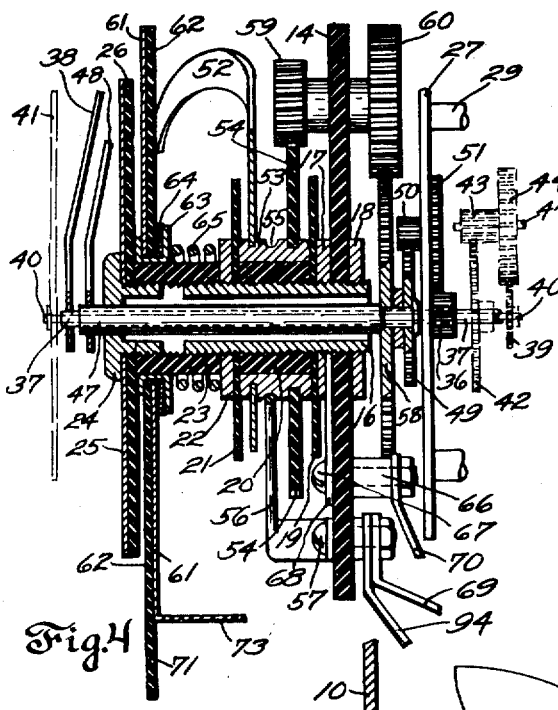

Fig. 4 shows a portion of the mechanism in

Fig. 2 drawn on a larger scale more clearly to illustrate modified details of construction.

Figure 5:
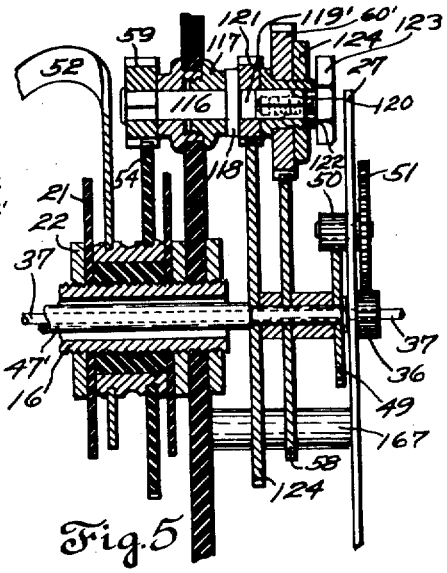

Fig. 5 shows on a scale similar to Fig. 4 a still further modification of gearing construction for changing the ratio through which the circuit controller is rotated.

Figure 6:
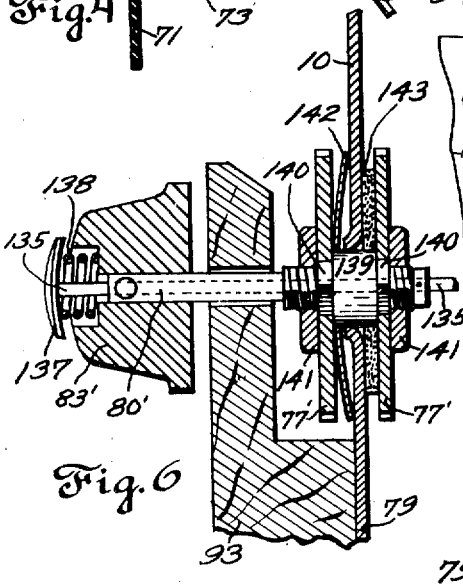

Fig. 6, on a correspondingly enlarged scale, shows a modification of the time setting manual of Fig. 2 whereby this manual becomes self-braked to remain stationary without being held while the other manual is being adjusted. Fig. 6 further shows separately movable handles on concentric spindles for independently actuating the switch mechanism and the clockwork.

Figure 7:
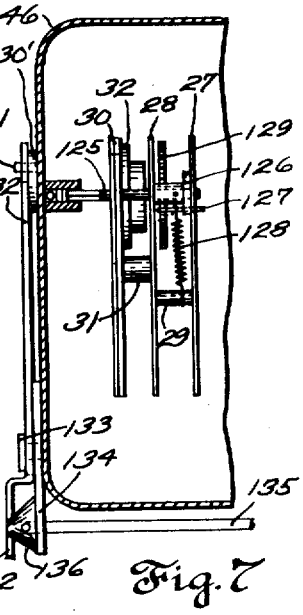

Fig. 7 is a partial view of the clock motor as viewed from the left looking at Fig. 1 with the cover of the unit shown in section and serving to mount an agitating mechanism for starting in motion the clock movement.

Figure 8:
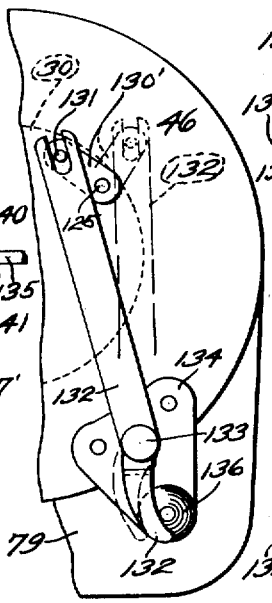

Fig. 8 is a rear view of the agitating mechanism of Fig. 7 as same appears when looking from the left at Fig. 7.

Figure 9:
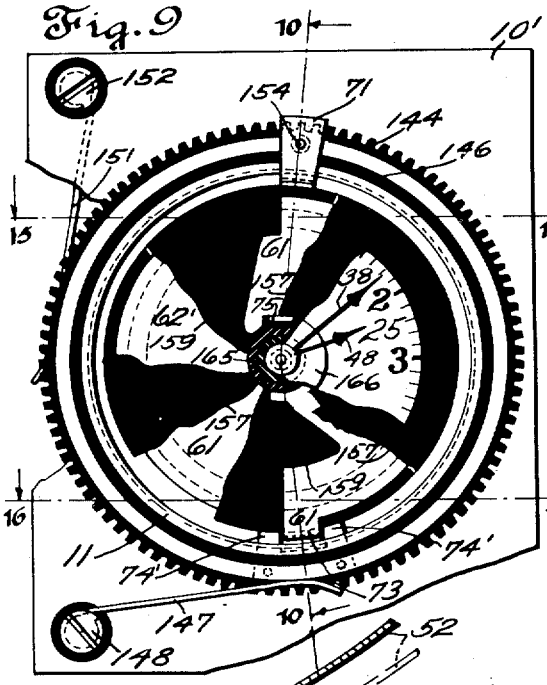

Fig. 9 is a front view of a modified construction of the clock switch unit wherein the clock face and hands are only fragmentally shown and the time setting discs of the switch are modified and cut away to indicate their interleaved relationship.

Figure 10:
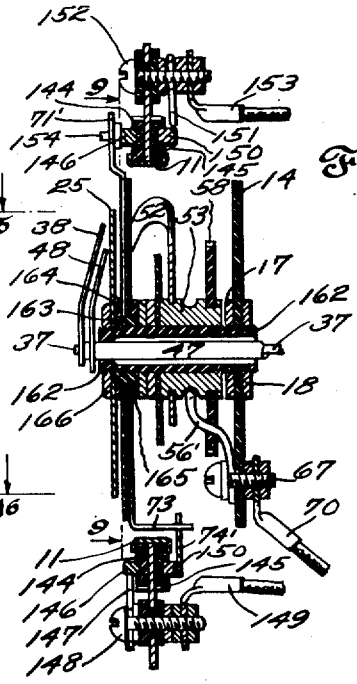

Fig. 10 is a view of the modified construction taken in section on planes 10—10 in Fig. 9 looking in the direction of the arrows.

Figure 11:
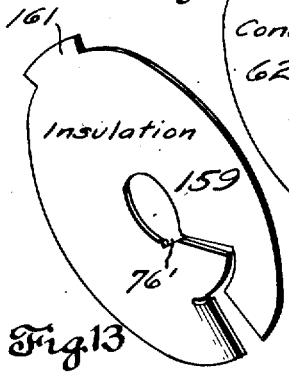

Fig. 11 is a detail view in perspective showing one of the circuit controlling discs.

Figure 12:
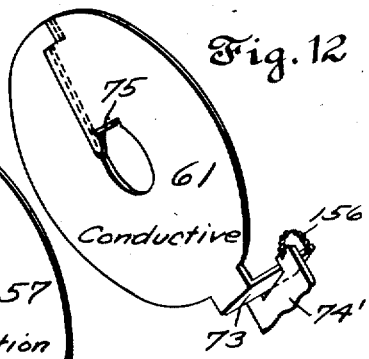

Fig. 12 is a similar view showing the other circuit controlling disc.

Figure 13:
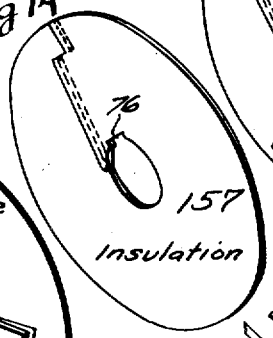

Fig. 13 is a similar view of an insulative facing for the disc of Fig. 11.

Figure 14:
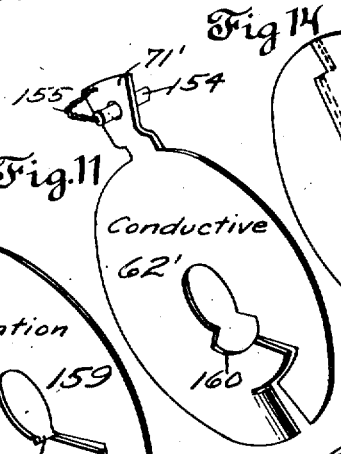

Fig. 14 correspondingly shows an insulative facing for the disc of Fig. 12.

Figure 15:
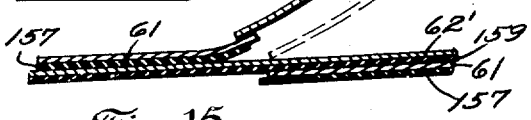

Fig. 15 is a sectional fragmentary view taken on the plane 15—15 in Fig. 9 to show the relationship of the interleaved discs of Figs. 11 to 14, inclusive, at their point of circuit switching action.

Figure 16:
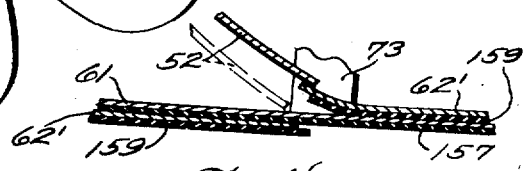

Fig. 16 is a view similar to Fig. 15 taken on the plane 16—16 in Fig. 9 showing the relationship of the discs at their other point of circuit switching action.

For the purposes of constructing my improved clock switch as a self-contained, unitary device, I provide a framework including a partition or main frame plate 10 having a large circular aperture through which, and beyond both faces of which, extends a diametrically large thin-walled flanged bearing eyelet 11. A ring gear 12 is retained by one flange of this large bearing eyelet against the front surface of frame plate 10, and a similar ring gear 13 is retained by the other flange of the same eyelet against the rear face of frame plate 10. Ring gears 12 and 13 are thus supported for independent rotation on opposite sides of the frame plate 10. There will occur to those skilled in the art obvious equivalents for this particular construction which will permit gears 12 and 13 to be correspondingly disposed and operative.

I may construct a support means for the switch and time telling parts in the form of a base plate slab 14 of insulative material firmly attached to and spaced rearward from frame plate 10 by the support brackets 15. Bearing structure which helps to support the circuit switching and time telling parts may include a tubular rigid bushing 16 threaded at its rear end to receive a front clamp nut 17 and a rear clamp nut 18 which nuts when set up against the respectively opposite sides of base plate 14 serve to hold the bushing 16 in rigid perpendicular relation thereto and projecting forward therefrom concentrically with the ring gears 12 and 13 as best shown in Fig. 4.

Members fixedly carried by the stationary bushing 16, in their order from back to front, comprise as also clearly shown in Fig. 4, a large thin insulative washer 19, the insulative collar 20, another large insulative washer 21, and a third clamp nut 22 having threaded engagement with the forward end of bushing 16 and serving to thrust the washers 19 and 21, together with the insulative collar 20 axially backward and tighten them fixedly against the clamp nut 17 so that all these parts are in effect made rigid with the bearing bushing 16. Further parts fixedly supported upon the bushing 16 comprise the internally threaded, insulative collar 23 which has threaded engagement with the front end of bushing 16 and projects forward from the front end thereof and at its own front end receives and insulates from electrical contact with bushing 16 a retaining screw 24 the enlarged head of which clamps a clock face dial 25, backed by an insulative facing 26, against the forward end of insulative collar 23 whereby the clock dial is supported concentrically with the ring gears 12 and 13. Dial 25 is represenative of any circuitous scale of time-of-day markings stationed in relation to frame plate 10. The retaining screw 24 may be recessed as shown in Fig. 4 to reduce the axial length of its central hole that serves as a steadying bearing for the rotary spindles for the clock hands later to be described.

The prime mover of my improved assembly of clockwork may incorporate any kind of spring driven movement or electrically powered reduction gear train capable of running at a constant speed for time keeping purposes. The movement herein shown includes an electric motor, preferably of the synchronous type, that is inherently capable of keeping in step with the time characteristics of an alternating current. One example of this type of motor is disclosed in United States Patent No. 1,864,108. The only description thereof necessary to be given herein is that its framework may comprise a front frame plate 27 mounted on, and spaced from, base plate 14 by posts 167 together with an intermediate plate 28 connected in spaced relation to plate 27 by posts 29, and a rear plate 30 connected to and spaced from intermediate plate 28 by posts 31. The rear frame plate 30 of the time giving train or movement may be formed and made of material suitable to constitute the magnetic or field stator for motor armature 32, field stator plate 20 being energized for this purpose by an alternating current coil 33 wound about a laminated bar 34, magnetically contacting said plate. A train of reduction gears may provide operating connection between the armature pinion 35 and another pinion 36 fast to the spindle 37 that extends through the stationary bushing 16 and at the front end thereof carries a clock hand 38 swingable about an axis transversely of which frame plate 10 extends. The same spindle 37 may extend rearward from pinion 36 through the movement plates 28 and 30 to be manually turned for setting the clock hand by means of a button 45 which may detachably engage a squared terminus of spindle 37 and itself be rotatably mounted in the rear wall of the rear section 46 of the casing structure.

In some constructions of the clock switch unit

I prefer so to arrange the movement gearing that spindle 37 and hand 38 shall rotate at a speed of one revolution in one hour thus to serve as the so-called "minute hand" of an ordinary clock. In other constructions I prefer to arrange the movement train to impel directly a pinion 39 fast to the spindle 40 and extending through spindle 37 (made hollow for this purpose) to carry at its forward end the sweep hand 41, which parts are shown in broken lines in Figs. 1 and 4. Spindle 40 and hand 41 may then be driven at a speed of one revolution in one minute to serve as the so-called "second hand" of an ordinary clock and, by its greater and therefore visible speed, to inform an observer whether the clock is running or has stopped. In the case of using spindle 40 and hand 41, pinion 36 may derive its movement by being fixed to minute spindle 37, the latter carrying gear 42 also fixed thereto and impelled from pinion 39 by the reducing idler gears 43 and 44 whose common spindle 44' is of course rotatably supported in bearing plates 27 and 28 of the clock movement.

Whether or not the sweep hand 41, its spindle 40 and the gears 42, 43 and 44 are employed, the "minute" spindle 37 may be surrounded by the usual hollow spindle 47 carrying the "hour" hand 48 between the minute hand 38 and the clock dial 25. Hollow spindle 47 will be rotated at the usual speed of one revolution in twelve hours by means of the gear 49 fixed on its rear end because gear 49 is driven from pinion 36 in the ratio of 1 to 12 by the idler reduction gears 50, 51, the former of which is at the front of movement plate 27 while the latter is at the rear of said movement plate, both of said idler gears 50 and 51 being fixed to turn in unison on a common spindle not shown but projecting through and having bearing in the movement plate 27. As the hour spindle 47 is given rotary bearing support in the screw 24 and as the minute spindle 37 is given rotary bearing in the movement plate 27, and as spindles 47 and 37 (as well as 40 when used) rotate in telescoped relationship, it will be plain that they are adequately supported for free rotation at their respectively different speeds without tendency to bind even if variations occur in the assembled relationship of the stationary supporting parts extending between the bearing screw 24 and the movement plate 27.

The clock controlled circuit maker and breaker of my improved construction is similar in nature to that disclosed in my aforesaid U. S. Patent No. 2,004,137 and includes a current distributor in the form of *a time wheel continually rotatable about a fixed axis and including a* helically disposed contact wiper 52 *presenting a camming surface that is disposed in oblique relation to the axis of rotation of the time wheel,* preferably of resilient conductive material, fixed to rotate in unison with a metallic hub 53 to which is also fixed the gear 54 preferably made of insulative material. Hub 53 is freely rotatable about the stationary insulative collar 20 between the insulative washers 19 and 21 and contains a peripheral groove 55 constantly contacted conductively by the resilient current carrying brush 56 mounted on the insulative base 14 by screw 57.

*My above said U. S. Patent No. 2,004,137 explains that the wiper 52 presses against first one and then the other of discs 61 and 62 in its slowly impelled circular movement as it travels in unison with the clock hand, and that it will climb up and drop off from raised lip portions of the discs that are herein best pictured in Figs. 15 and 16. This of necessity gives rise to the tendency of wiper 52 to drag the disc 61 or 62 along with it in its circular path of travel. Prevention of the rotary displacement of each disc in response to such drag is aided by the braking effect or disc staying action of the spring washers 142 in respect to each of the discs 61, 62 as will hereinafter be explained.*

The contact wiper 52 is thereby constantly supplied with current through the brush 56 while rotatively impelled by suitable transmission gearing driving the insulative gear 54 and driven by the time movement, or any part motivated thereby, in a manner to travel in unison with some one of the three clock hands 38, [31] *41* or 48, or at some predetermined speed ratio in relation thereto. For convenience of illustration I have not shown the contact wiper gear 54 as driven from the time movement through a train separate from that which impels the time telling clock hands but instead I have shown the hour spindle 47 equipped near its rear end with a second gear 58 fixed thereon and I have shown an idler gear 59 in mesh with the insulative contact wiper driving gear 54 at the front of the switch base 14 and connected to turn in unison with the idler gear 60 at the rear of said base which gear 60 is in mesh with gear 58. Thus the contact wiper 52 may be rotated, say, in unison with the hour hand 48 if pinions 59 and 60 are equal to each other in diameter and gears 54 and 58 are equal to each other in diameter, or, if preferred, at half the speed thereof, as would be the case with the relative sizes of gears 54, 59, 60 and 58, that are shown in Fig. 4.

The means which determine the time at which a circuit shall be made or broken by the clock impelled contact wiper 52 include switch action controlling elements in the form of interleaved and relatively adjustable discs or rings for the most part similar to those described in detail in my aforesaid Patent No. 2,004,137 wherein a *graduated* split disc 61 of conductive material *carrying a series of time interval indicating marks 88* is interslidably adjustable in helically interleaved relationship to a *screening* split disc 62 of insulative material *containing a break in its circular continuity and carrying a time setting index consisting of a visible edge of such break settable into various time signalling relationships to the time-of-day markings on clock dial 25,* both of these discs being carried upon a central hub 63 which may comprise a thin walled bearing eyelet between whose rear head and said discs is assembled a cupped spring washer 64 to insure good electrical conductance between disc 61 and hub 63. The two discs 61 and 62 with their hub 63 thereby comprise a unitary rotatable structure adjustably turnable about the insulative collar 23 back of the clock dial 25 and insulated therefrom by the facing 26. Suitable disc stationing friction is imparted to the discs 61 and 62 by their mutually acting broadside *contact and* pressure against each other aided by the spring 65 which exerts an axially expansive thrust between the disc hub 63 and the clamp nut 22 heretofore described. *Such broadside contact also causes a tendency of one of said discs to be turned by the turning of the other disc.* Spring 65 is thus part of the means of electrical contact between the conductive disc 61 and a binding post 66 secured to the switch base 14 by a screw 67 which is placed in electrical connection with the clamp nut 17 by a radial conductive strap or buss bar 68 clamped between nut 17 and the base plate 14.

All parts have now been described which enable the contacting with, and separation from, switch action controlling elements 61 and 62 of wiper 52 respectively to make and break a circuit extending from the lead-in wire 69 to the lead-out wire 70 through the following conductive parts: strap 68, nut 17, bushing 16, nut 22, spring 65, hub 63, washer 64, conductive disc 61—wiper 52, hub 53, brush 56, and screw 57, all of the above conductive parts being separated from all other metallic parts of the mechanism or frame by parts composed of insulation as hereinbefore described.

In my U. S. Patent No. 2,004,137 means for engaging the discs 61 and 62 for shifting their relative rotative adjustment as well as their absolute rotary positions are provided consisting of axially disposed insulative projections or studs attached respectively to the discs. Fig. 2 herein (as well as Figs. 11 and 12) show a construction of these discs wherein no propelling stud or the like is attached thereto but wherein the material of the discs themselves is extended at suitable points to project in suitable directions from the peripheral edge of each disc to be engaged by suitable propelling shoulders carried by ring gears 12 and 13, respectively, for manually effecting selective rotative adjustments of each disc while the conductive disc 61 is thus precluded from conductive contact with any metallic parts of the unit other than those designed to complete an electric circuit as hereinbefore described.

The radial projection 71 extending from the peripheral edge of insulative disc 62 contains an opening which may be engaged by a forwardly extending pin 72 carried by the front ring gear 12 whereby pin 72 can propel insulative disc 62 in either rotary direction, while the backward extension 73 of a tongue-like continuation of the sheet material of conductive disc 61 occupies a notch in an insulative impelling lug 74 carried by the rear ring gear 13 whereby lug 74 can propel the conductive disc 61 in either rotary direction. The turning of each of discs 62 and 61 relative to the other, as adjusted respectively by the turning of ring gears 12 and 13, is preferably limited to substantially one complete circle of relative movement by any suitable means such as stops which might co-act between the ring gears 12 and 13. For this purpose the large bearing eyelet 11 on which these ring gears are mounted might be arranged to turn fixedly with one of said gears and be turnable relatively to the other gear only to an extent that is limited by the said stops arranged to act between the eyelet 11 and the ring gear which turns relative thereto. A fuller explanation of the details of construction and operation of these discs and their stop limited relative movement is contained in my Patent No. 2,004,137 where corresponding parts are identified by corresponding reference numerals.

The ring gears 12 and 13 are manually adjusted respectively by separate spur gears 77 and 78, these spur gears being on respectively opposite sides of an apron-like extension 79 of the otherwise circular main frame plate 10 on which each of said spur gears is pivotally mounted. Said spur gears carry respectively forwardly projecting operating spindles 80 and 81 turnable by manuals in the form of finger knobs 82 and 83 whereby gears 77 and 78 may be rotated manually together or separately. *The foregoing parts thus constitute separate time setting mechanisms for adjusting the discs 61, 62 individually to their selective settings.* A click such as shown at 84 in Fig. 1 limits the permissible degree of backward turning of each of gears 77 and 78 for the purpose of preventing make and break of the circuit between contact wiper 52 and the conductive disc 61 other than with a snap action.

The protective and dust proof enclosing structure which houses the clockwork assembly hereinbefore referred to includes a bezel ring 85 holding a clock face crystal 86. A mat ring 87 borders an annular space around the edge of the clock dial 25 in which annular space time setting arcuate signal charts in the form of curved bands of the contrasting distinctive colors of discs 61 and 62 are visible as shown in Fig. 1, thereby to indicate by the arcuate length and circular positions of said curved color bands the portions of the full cycle of time represented by the complete circle of the clock face during which the clock controlled circuit will remain made or will remain broken. Conventional clock face graduations on the clock dial 25 may serve to measure and indicate the hours and fractions of hours represented by the relative and absolute positioning of the contrasting visible arcuate signal charts determined by the circular positioning of discs 61 and 62, but if preferred I may render the measurement and indication of elapsed time represented by the extent of these color bands even more readily and exactly discernible by adding to the visible portion of discs 61 and 62 themselves indicia quantitatively expressing different time intervals as illustrated in the case of one disc in Fig. 1 where the graduations 88 serve to measure and indicate the number of hours and fraction of hours represented by the arcuate extent of the exposed portion of disc 61. Corresponding graduations could of course be applied to the other disc. To accord with the gear ratio of 1 to 2 indicated between the hour hand spindle 47 and the contact wiper 52, I may graduate the mat ring or alternative clock face 87 to represent a division of the complete circle into 24 hours arranging the markings to make evident that twelve of these hours are hours of the day, and that the other twelve are hours of the night. In such case the graduations on the clock dial 25 will be referred to only for telling the time of day and the graduations on the mat ring 87 will be referred to for telling what time of day or night the automatic circuit switching action will take place. Obviously I might add graduations to the clock face 25 for 24-hour divisions of a complete circle in place of placing such graduations on the mat ring 87.

As part of an enclosing structure I may provide the dust-proof protective casing 46 with a flange portion 89 which may be clamped firmly to the main frame plate 10 by the same nuts 90 and spacer studs 91 which hold the bezel ring 85, the casing 46 being notched and slotted as indicated in Fig. 2 to form a narrow opening into its interior just back of plate 10 to permit entrance thereto of the gear 78 for meshing respectively with ring gears 12 and 13. Studs 91 and thereby the entire appliance may be held firmly and removably on any supporting structure such as the closure panel 92, 93 or 96 by means of preferably three or more screws 168.

Studs 91 and nuts 90 are capable of supporting and holding firmly together with or without the presence of the enclosing structure comprising parts 46, 85 and 86, the partitions 10 and 14. My improved clock controlled switch appliance comprises an integral structure whether assembled as an exposed unit without protective cover 46 or as a completely housed operative mechanism, and it likewise comprises an integral structure together with all the above described protective parts. When thus applied as a unit it is adapted to be rigidly mounted at the rear of a sight aperture 9 against the rear surface of a thin metal support wall or panel as 92, or against a thick wooden support wall or panel as 93, in either of which cases the clock crystal 86 may lie substantially flush with the front face of such wall or panel. The length of studs 91 may be chosen to this end and such wall or panel will contain openings through which the time setting spindles 81 and 80 project. Knobs such as 83 and 82 may be detachably secured respectively to spindles 81 and 80, these knobs being the only working parts required to be removed in mounting or dismounting the entire clock switch unit from the wall or panel of any appliance or machine to which the unit is applied. It is further apparent that in some cases the knobs 82 and 83 can be made so small in comparison with the openings for spindles 80 and 81 that even these knobs could be withdrawn through said openings without requiring their removal.

Illustrative of a useful application of the complete clock switch unit of Figs. 1 and 2, I show this unit in Fig. 3 mounted upon the inside surface of a sheet metal door 96 hinged to a cabinet 97 by brackets 98 and hinge pins 99, the cabinet 97 containing a remote control, or electromagnetic, switch commonly termed a relay. The remote control switch comprises an insulative base 100 on which is mounted electric arc-baffling shields 101 at the point where contact is made and broken between a line terminal 102 and its corresponding load terminal 103 and simultaneously between a second line terminal 104 and its corresponding load terminal 105, the action of this contact making and breaking mechanism being effected by the rocker core 106 of an electromagnetic coil 107 mounted upon a common squared rocker shaft 108 to swing therewith in unison with the contact arms 109 and 110. The core 106 is withdrawn from magnet coil 107 by gravity, or by suitable spring means (not shown), and upon energization of magnet coil 107 is drawn within same to rock the contact arms 109 and 110 in unison to contact making position. Terminals for the magnet coil 107 are shown at 111 and 112, respectively, and the electrical connection of the three wires 69, 70 and 95 to the supply line and to the magnet coil 107 will be clear from Fig. 3. Here these three wires are shown as leaving the cover 46 of the clock switch unit through the insulative bushing 113 and detachably secured respectively to three binding posts on the insulative block 114 to each of which binding posts are respectively secured individually insulated wires of flexible nature which permit the opening and closing of the door 96 relative to cabinet 97. By the means just described, wire 69 connects electrically to both the right line terminal 104 and the magnet coil terminal 111; wire 70 connects electrically with the other terminal 112 of the magnet coil 107; and wire 95 connects to the left line terminal 102. By these connections the magnet coil 107 of the remote control switch is energized and de-energized by the circuit controlling action of contact wiper 52 in the clock operated switch unit, while the motor coil 33 of the timing movement is constantly energized through permanent connection to the line terminals 102 and 104 of the electromagnetic switch. It will be understood that when the cabinet door 96 is closed the clock face dial 25 and time setting discs 61 and 62, as well as the time setting controls 82 and 83, are all accessible or visible from the exterior of cabinet 97 in the manner shown in Figs. 1 and 2. There is room in the upper portion of cabinet 97 to receive the clock switch unit when the door 96 is closed, the flexible wires being suitably secured by clips 115 at different points properly to hold these wires from interference with any of the working parts of the mechanism. From the foregoing description it will be appreciated that it is a very easy matter to remove the clock operated switch unit completely from the cabinet of the remote control switch in the case of needed attention or repairs to the clock or the switch unit. This can easily be done by inexperienced mechanics in the field who without expert repair experience will thus be able to replace a defective time switch unit with a spare or replacement unit that is in good operating condition without appreciable interruption of use of the relay.

As in some uses it is desirable to have the contact wiper 52 travel at the same rate of speed, or in strict unison with, the hour hand 48 of the clock while in other uses it is preferred that contact wiper 52 travel at half that speed thus consuming 24 hours in making one revolution, economies of manufacture and commercial distribution can be effected by providing a gearing arrangement for driving contact wiper 52 which will be shiftable at will to produce either one of the above mention speeds. A peculiar requirement of such arrangement is that the wiper 52 must always so rotate as to coincide with the position of hour hand 48 at its point of circuit breaking action when the hour hand is at some definite and predetermined point in its travel. Usually this will be when the hour hand points to 12 where as is shown in Fig. 1, the cardinal "12" of a stationary 24-hour series of graduations coincides in its position on the circle with cardinal "12" on the time telling clock face. In such case, therefore, whether the wiper 52 rotates in sychronism with the hour hand, or completes one revolution to every two revolutions of the hour hand, it will always be necessary that when the contact wiper 52 (or its operating tip which snaps from one to the other of discs 61, 62) is at exactly top center position in Fig. 1, the hour hand shall point exactly to twelve o'clock, and no change in this condition must be brought about through the act of shifting the speed at which contact wiper 52 shall be impelled, since the same condition must obtain if the wiper 52 is to be geared to travel at a speed equal to that of the hour hand or only half as fast.

With these particular requirements in mind, I have shown in Fig. 5 a modification of the construction of the idler gears 59 and 60 wherein an idler spindle 116 is given bearing of appreciable length in a bushing structure 117 which extends through the switch base 14 and is fast thereto. Spindle 116 carries fixed pinion 59 at its forward end as in Fig. 4 but at its rear end is provided with a shoulder 118, a round portion 119' of reduced diameter, and a rear squared terminus 120 threaded internally from its rear end. A pinion 121 of the same size as pinion 59 may turn loosely on spindle 116, or be clamped to rotate fixedly therewith, by means of a bushing 122 slidably fitted to the squared terminus 120 of spindle 116 and overhanging the same to receive the tightening thrust of the head of a screw 123 engaging the threaded hole in the rear of spindle 116. Leaving screw 123 tight or loose will determine whether pinion 121 is fast or loose respectively in relation to spindle 116. Pinion 121 is in mesh with an additional gear 124 which turns fixedly with the hour hand spindle 47' and is of the same diameter as the contact wiper gear 54 so that when pinion 121 is fast to spindle 116 the contact wiper 52 will rotate at the same speed as an hour hand 48. In this modification I give the rear idler gear 60' (which is similar in size to the idler gear 60 of Fig. 4 and is in mesh with the same hour spindle gear 58) a loose or tight connection on the clamp bushing 122 dependending on whether a clamp nut 124 it set up tightly or loosely on the threaded exterior of bushing 122 by means of which gear 60' may be forced forward against the front shoulder on said bushing to be made fast thereto. Obviously, the above described mechanism would lock and be inoperative if both the screw 123 and the clamp nut 124 are tightened at the same time, but if one alone is tightened and if in shifting the gear ratio the other is tightened before the first is loosened, no relative movement will have taken place between the hour spindle 47' and the contact wiper 52 as a consequence of having shifted the effective drive connection of contact wiper 52 from gear 121 to gear 51, or vice versa. Accordingly it will be appreciated that if the clock hands are set to exactly twelve o'clock when the shift in gear ratio is made, the wiper 52 will not be thrown out of accurate rotative relationship to the clock hands with respect to its performing circuit switching automatic action at the true times of day or night indicated by the settings of the discs 61 and 62 against their designed scales of graduations.

The timing movement energized by the coil 33 may be a synchronous motor of the self starting type or of the nonself starting type. In the latter case, for convenience in restarting the motor should it stop from current interruption, I may employ a spinning device best shown in Fig. 7 consisting of a starter spindle 125 journaled in the movement plates and carrying fixed to turn therewith between plates 26 and 27 a flanged member 126 which carries secured in its flange and disposed parallel to its axis, the starter pin 127 connected by the spring 128 to the movement post 29. The starter pin 127 as carried with the flanged member 126 swings in an arcuate opening in the movement plate 27 the ends of which opening limit the swinging travel of pin 127 in both directions, the spring 128 normally stationing the pin 127 in contact with one end of said opening and out of contact with the armature gear 129. On turning the spindle 125 clockwise as viewed in Fig. 8 to the limit of movement permitted by the travel of pin 127 in its arcuate slot, the rear end of pin 127 is swept into engagement with teeth of the armature gear 129 so that when suddenly released by the hand of the operator the pin 127 is snapped back to its normal or starting position thus imparting a spin to the armature gear 129 through the rapidity of the spring caused action. The speed thus imparted to armature gear 129 is preferably as great as, or greater than, its normal running speed so that the armature 32 may by this starting movement slow down into exact step with its designed ratio of speed in relation to the oscillations of alternating current in the coil 33.

In Figs. 2 and 3 I show the starter spindle 125 manually operable by a simple crank handle 130 outside the protective cover 46. In Figs. 6, 7 and 8, I show the crank handle 130 replaced by an arm 130' carrying the pin 131 to be engaged by the forked end of a rocker lever 132 pivoted at 133 to a bracket 134 which is secured to the rear face of the protective cover 46. The bracket 134 gives sliding bearing to a push rod 135 carrying a cone shaped actuator 136 at its rear end adapted to act upon the lower offset end of rocker lever 132 for displacing the latter when the actuator 136 is thrust toward the rear, the broken lines in Fig. 8 indicating the positions to which arm 130' and rocker lever 132 will thereby be moved against the tension of spring 127. Whereas the push rod 135 may extend to any accessible position for use by the operator of the clock switch unit, I have shown in Fig. 6 that it may extend forwardly through the shaft 80' or 81, made hollow for this purpose, thereby to permit the operative association of push rod 135 with either of the time setting knobs as 82', the rod 135 terminating in a push button 137 forced yieldably forward relative to knob 83' by the thrust of spring 138 whereby the starting of the electric motor is reliably accomplished by pushing the push button 137 inward and releasing it suddenly so that it will snap outward.

Fig. 6 further shows a modified construction applicable to one or both of the gears 77 and 78 which mesh with ring gears 12 and 13, respectively, for adjusting the times of circuit controlling switch action. In this modification the spindle 80' is made with a round portion 139 journaled in the frame plate 10 and flanked at each side of said frame plate by squared portions 140. On each of these squared portions there is carried a similar gear 77' secured by a thrust nut 141 engaging threaded portions of spindle 80'. Between the front gear 77' and the frame plate 10, a cupped spring washer 142 acts to thrust spindle 80' and all parts carried thereby, forwardly, there being a slight space to permit a little rearward movement of these parts against the tension of washer 142. Between the rear gear 77' and the frame plate 10 is a washer 143 of friction material affording yieldable resistance to the turning of the rear gear 77' with which it has considerable area of surface contact. This arrangement affords what in effect is a self-braking or self-staying action of each spindle 80' or 81' and consequently of ring gears 12 or 13. The frictional resistance of washer 143 is conveniently annulled or overcome by the forces that would be imparted to knobs 82' or 83' by the hand of the user in the natural manner of operating same. Hence in this construction either of discs 61 or 62 will remain stationary while the other is shifted relative thereto without requiring simultaneous grasping and manipulation of both time setting knobs in order to prevent either disc 61 or 62 from turning with the other.

In Figs. 9 to 16, inclusive, I show a modification of certain parts of my improved clock switch unit, such modification as concerning the ring gears 12 and 13, enabling me to lead the current to and from the time controlled switching parts by current feeding or current take-off brushes wiping on conductive parts carried on said gears. As concerning the circuit controlling discs 61 and 62, themselves, the modification illustrated in Figs. 9 to 16 enables a universal time setting to be made in accordance with the principles disclosed in my Patent 2,004,137, where instead of only one conductive disc, there are two or more relatively adjustable discs both of conductive material and completely insulated from each other in every possible relative position as well as from the frame and from all metal operating mechanism of the entire clock switch unit except the contact wiper 52. This wiper in its circuit controlling rotation will be transferred with a snap action from one of these conductive discs to the other, and vice versa, being in no rotary position able to contact both of said discs at the same time. This enables the use of the time controlled switch for shifting current automatically from one circuit to a different circuit and back again at respectively predetermined times, instead of for merely making and breaking a single circuit.

In Figs. 9 and 10 the ring gear 144 rotatively adjustable by gear 77 (not shown in Figs. 9 and 10) is made of insulating material and disposed against the front face of frame plate 10 as is the ring gear 12 of Fig. 2. A similar ring gear 145 of insulative material and adjustable by gear 78 (not shown in Figs. 9 and 10) is disposed against the rear face of frame plate 10 in the manner of ring gear 13 of Fig. 2. Embedded, inlaid, or otherwise suitably secured to the front face of ring gear 144 is a collector ring 146 of conductive material on which constantly bears the conductive brush 147 which is in electrical contact with binding post 148 mounted on and insulated from the main frame plate 10 and adapted to receive the wire 149 leading to one electric circuit. Correspondingly attached to the rear face of ring gear 145 is a collector ring 150 on which constantly bears the conductive brush 151 which is in electrical contact with binding post 152 mounted on and insulated from main frame plate 10 and adapted to receive the wire 153 leading to a different electric circuit.

Collector ring 146 carries the conductive pin 154 for propelling the projection 71' of a disc similar to disc 62 of Fig. 4 but made of conductive material. This conductive disc is numbered 62' (see Fig. 11) and because of the uncertain electrical contact that would result from mechanical looseness between pin 154 and the opening in projection 71' engaged by same, and because such mechanical looseness is desirable for compensating for any inaccuracy in the exact concentric relationship of the parts that turn in unison as well as to permit slight axial sliding movement between pin 154 and projection 71', a flexible conductive strap or connector 155 may be soldered or otherwise suitably secured to insure good electrical connection between pin 154 and projection 71' while accommodating slight relative movement therebetween. Collector ring 150 carries the conductive bracket 74' so disposed as to straddle and impel the projection 73 of conductive disc 61 in the same manner as insulative bracket 74 in Fig. 2, but because in Figs. 9 to 16 it is desired that good electrical contact shall exist between bracket 74' and the disc projection 73, a flexible strap 156 may be employed and attached for this purpose in the manner of the connector 155.

To maintain the discs 61 and 62' of Figs. 12 and 11 always insulated from each other in every possible rotative relation, I may insulate the front, or visible, face of disc 61 by enameling the same or in any other suitable way such as by joining fixedly to the said face of disc 61 a thin disc of insulation preferably of slightly larger diameter than disc 61 such as the disc 157 of Fig. 14 having the notch 76 beyond which in a forward direction, the stop lug 75 may project. In a similar manner I may enamel or otherwise insulate the front or visible face of disc 62' in Fig. 11 such as by cementing or otherwise securely fastening to said face of disc 62' a configurative disc of insulating material such as 159 in Fig. 13, same being of slightly larger diameter than disc 62' and carrying the notch 76' to coact as a stop with the lug 75 on disc 61, which latter is kept from contact with the metal of disc 62' by a larger notch 160 in the latter disc. Also to prevent projection 73 from coming into electrical contact with projection 71' when these two projections would otherwise engage and act as a limiting stop in the opposite direction of relative movement from that direction in which the relative movement is checked by lug 75 and the edge of notch 76', I may provide disc 159 with the peripheral projection 161 in such relationship to projection 71' as will operate to this end.

In the relationship of the parts detailed in Figs. 11 to 14 that is indicated in Fig. 9, the contact wiper 52 in its clockwise rotative movement as impelled by the time movement will snap from its full line position to its broken line position in Fig. 15 thus shifting the flow of current supplied through line wire 70, from disc 61 to disc 62', that is to say from the circuit lead wire 149 to the lead wire 153 of a different circuit. Likewise in the next circuit shifting action of wiper 52, the latter will snap from its full line position to its broken line position in Fig. 16, thus shifting the supply of current delivered by line wire 70, from disc 62' to disc 61, that is to say, from circuit lead wire 153 to circuit lead wire 149. It is thus seen how the modified clock switch of Figs. 9 to 16, inclusive, functions as a so-called "double-throw" switch instead of as an ordinary "on" and "off" switch. This double-throw feature is commonly applicable to remote control electric switches, gas valves or other devices reciprocated between two positions by the use of two magnets as indicated in Fig. 33 of the drawings of my United States patent, Number 1,984,204, granted December 11, 1934.

It will be noted from Fig. 10 how the take-off of current from the commutator rings 146 and 150 enables me to dispense with a compound support structure such as the conductive bushing 16, insulative collar 20, and insulative extension 23 of Fig. 4 and substitute therefor the single-piece insulative bushing 162 as a support for the clock face and for the parts which rotate concentrically therewith. I may also dispense with the hub eyelet 63 of Fig. 4 and arrange the discs 61 and 62' to bear rotatably on a simple insulative collar 163 between insulative washers 164 at their front and 165 at their rear. The retaining nut 166 having threaded engagement with the front end of insulative bushing 162 (used in place of the screw 24 of Fig. 4) may clamp the clock face or dial 25 directly against the front end of insulative collar 163. The friction spring 65 of Fig. 4 may also thus be omitted.

I claim:

1. A time telling electric circuit controlling appliance adapted to be detachably mounted as an exchangeable unit on a support wall, proximate a sight aperture therein, embodying in combination with a clock face, clockwork including a time-of-day telling clock hand cooperative with said clock face rotatable about an axis in position to be observed through said sight aperture, enclosing structure housing said clockwork, framework supporting said clockwork without the instrumentality of said enclosing structure including a partition to which at least part of said enclosure structure is detachably joined equipped to derive full support from said wall without the instrumentality of said enclosing structure said partition being directed crosswise of said axis within said enclosing structure and containing a frame hole, a ring-like time setting device bordering said frame hole and carried by said partition in a manner to be rotatably adjustable about said axis while positioned to be observed through said sight aperture, and electric current switching mechanism controllably related to said clockwork and deriving its support from said framework without the instrumentality of said enclosing structure including a contact member arranged to be settable adjustably around said axis by rotary movement of said time setting device.

2. A time telling electric circuit controlling appliance as defined in claim 1, together with a second ring-like time setting device carried by the said partition in a manner to be rotatably adjustable about the said axis relatively both to said partition and to the first said ring-like time setting device.

3. A time telling electric circuit controlling appliance as defined in claim 1, together with a second ring-like time setting device carried by the said partition in a manner to be rotatably adjustable about the said axis relatively both to said partition and to the first said ring-like time setting device and flanking the side of said partition opposite the first said ring-like time setting device.

4. A time telling electric circuit controlling appliance as defined in claim 1, together with a second ring-like time setting device on the opposite side of the said partition from the first said ring-like time setting device, and an eyelet-shaped annulus shaped and arranged cooperatively with said time setting devices and occupying the said frame hole in said partition in a manner to afford axially retentive internal rotary bearing support for both of said ring-like time setting devices.

5. A time telling electric circuit controlling appliance as defined in claim 1, in which the said time setting device comprises a time setting ring on one side of the said partition having spur gear teeth, together with a time setting ring on the other side of said partition having spur gear teeth, and separate ring actuating pinions pivotally supported at respectively opposite sides of said partition in mesh with the gear teeth of said time setting rings respectively.

6. A time telling electric circuit controlling appliance as defined in claim 1, in which the said enclosing structure is mainly cylindrical and the said partition comprises a flat plate having a circular area coextensive with the compass of said enclosing structure and extending radially in outboard relation therebeyond, and the said time setting device comprises a time setting ring on one side of said partition plate having spur gear teeth, together with a ring actuating pinion pivotally supported on the said side of said partition plate outside the compass of said enclosing structure in mesh with the gear teeth of said time setting ring.

7. A time telling electric circuit controlling appliance adapted to be detachably mounted as an exchangeable unit on a support wall proximate a sight aperture therein, embodying in combination with a clock face, a clockwork including a time-of-day telling clock hand cooperative with said clock face rotatable about an axis in position to be observed through said sight aperture, enclosing structure housing said clockwork including a transparent protective covering in front of said clock hand registering with said sight aperture, framework supporting said clockwork without the instrumentality of said enclosing structure including a partition to which at least part of said enclosing structure is detachably joined equipped to derive full support from said wall without the instrumentality of said enclosing structure said partition being directed crosswise of said axis within said enclosing structure and containing a frame hole, a ring-like time setting device bordering said frame hole and carried by said partition in a manner to be rotated adjustable about said axis while positioned to be observed through said sight aperture, and electric current switching mechanism controllably related to said clockwork and deriving its support from said framework without the instrumentality of said enclosing structure including a contact member arranged to be settable adjustably around said axis by rotary movement of said time setting device.

8. A time telling electric circuit controlling appliance as defined in claim 7, in which the said enclosing structure comprises two cupped sections joined in rim-to-rim relation, one of said sections including the said transparent protective covering.

9. A time telling electric circuit controlling appliance as defined in claim 7, in which the said enclosing structure comprises two cupped sections joined in rim-to-rim relation, and the said partition has a marginal portion fixedly sandwiched between said cupped sections.

10. A time telling electric circuit controlling appliance as defined in claim 7, in which the said enclosing structure comprises two cupped sections disposed in rim-to-rim relation, each of said sections having a radially outward directed flange at its rim, said rim flanges being fastened separably together, and means penetrating said rim flanges for demountably attaching said enclosing structure to the said support wall at points bordering about the said sight aperture therein.

11. In a settable double-throw time switch for shifting current flow from one circuit to a different circuit the combination of, a circuitous scale of time designating indicia, terminals of two electric circuits, a first cross-split ring of composite conductive and non-conductive united materials having a front face of non-conductive material in register with said indicia and a rear face of conductive material electrically connected with one of said terminals, a second cross-split ring of composite conductive and non-conductive united materials having a front face of non-conductive material in register with said indicia and a rear face of conductive material electrically connected with the other of said terminals, means rotatably supporting said rings so that at least one ring may flex to a helical form and so that each ring may be rotated through the split portion of the other ring thereby to dispose varying extents of its circular lengths on respectively different sides of the other ring, and a rotatable electric distributor mounted to wipe against the rear faces of said rings sequentially for delivering current to either of said circuit terminals.

12. In a settable time switch the combination defined in claim 11, together with two setting rings of insulating material supported for rotary adjustive movement coaxially with the said cross-split rings, each of said setting rings carrying a circular conductive track electrically and mechanically coupled to the said conductive material of a different one of said cross-split rings, and a current conductive brush disposed to wipe against each of said conductive tracks.

13. In timing mechanism, the combination of, a clockwork, a stationary clock face, a spindle driven by said clockworks, a clock hand carried by said spindle to sweep in front of said clock face, indicia on said clock face including an index mark, electric switch controlling mechanism including a rotor coaxial with said spindle, and a variable speed transmission comprising two sets of constantly meshing gears connected to impart alternatively to said rotor motion derived from said clockworks.

14. In timing mechanism, the combination defined in claim 13, in which the said variable speed transmission includes two pairs of change gears with the gears of each of said pairs constantly in mesh, and means to clutch one of the gears of either of said pairs to the said clockwork and simultaneously to declutch one of the gears of the other of said pairs from the said rotor in a manner to vary the speed ratio between said clockworks and rotor without displacing said rotor from its relation to said index mark.

15. In a multiple scale time indicating mechanism, a time movement, two scales of time indicia arranged in concentric circles and designating respectively different intervals of time corresponding to equal segmental portions of said concentric circles, at least one signal device movable in a path to register with both of said scales of time indicia simultaneously thereby to designate respectively on both of said scales at least two of said different intervals of time, and electric switch controlling mechanism including a stationary part cooperative with said signal constructed and arranged to be settable in accordance with the position of said signal along said path and a movable part cooperative with said stationary part, together with speed changing mechanism comprising two sets of constantly meshing gears connected to transmit impelling power alternatively from said movement to said movable parts of said switch controlling mechanism.

16. In a combined clock and time switch unit, the combination of, electric switch control mechanism, clockwork objectively associated with said mechanism including motor driven time telling hands, separately movable handles connected respectively to actuate said mechanism and said clockwork, and coaxial spindles separately and independently movable operatively connecting said handles to said mechanism and said clockwork respectively at least one of said spindles being movable in an axial direction for actuating said clockwork.

17. The combination of a switch cabinet, a door having a sight aperture hinged to said cabinet in a manner to swing to a position completing closure for the interior of the cabinet, an electro-magnetic circuit controller of relatively high electrical capacity within said cabinet including a contact actuating solenoid, a time switch unit of relatively low electrical capacity carried detachably by said door on the cabinet side of said sight aperture and registering with the latter, and electrical conductors connecting said solenoid to said time switch unit constructed and arranged to permit said door to swing to and away from its said closure completing position.

18. In a settable time switch, the combination of, a scale of circularly arranged time designating indicia, a first cross-split ring, a second cross-split ring, means rotatably supporting said rings so that at least one ring may flex to a helical form and so that ring may be rotated adjustably through the split portion of the other ring, electric switch controlling means including a time driven element and an adjustably settable stationary member cooperative therewith, signal means registering with said indicia and adjustably settable in accordance with various stationary positions of said member, separate manuals connected respectively to rotate said rings adjustably, and yieldable brake means automatically operative to resist the rotary adjustment of at least one of said rings thereby to retain the said one ring while the other ring is rotated adjustably by its said manual.

19. In a concentric clockwork and time switch mechanism, a frame plate for supporting both clockwork and time switch mechanism, a hollow post perpendicular to and rigid with said plate, a threaded tube of insulating material fixedly carried at the free end of said post[s], a nut having threaded engagement with said tube and insulated thereby from said post, a clock hand, a clock face removably retained on said tube by said nut, a clock spindle extending through both said post and said tube and journaled in said nut carrying a clock hand in front of said clock face, and electrically conductive current switching parts between said frame plate and said clock face rotatably supported in part by said post and in part by said tube.

20. A time telling electric circuit controlling appliance adapted to be detachably mounted as an exchangeable unit on a support wall proximate a sight aperture therein, embodying in combination with a clock face, clockwork including a time-of-day telling clock hand cooperative with said clock face rotatable about an axis in position to be observed through said sight aperture, enclosing structure housing said clockwork, framework including a main partition to which at least part of said enclosing structure is detachably joined equipped to derive full support from said wall without the instrumentality of said enclosing structure said partition being directed crosswise of said axis within said enclosing structure and containing a frame hole, an auxiliary partition supporting said clockwork also extending crosswise said axis deriving full support from said main partition without the instrumentality of said enclosing structure, a hollow bearing post concentric with said axis fixed on and projecting from said auxiliary partition and carrying said clock face, spindle connections extending through said hollow post and through said auxiliary partition impellably connected to said clock hand, a ring-like time setting device bordering said frame hole and carried by said main partition in a manner to be rotatably adjustable about said axis while positioned to be observed through said sight aperture, and electric current switching mechanism controllably related to said clockwork deriving its support from said bearing post without the instrumentality of said enclosing structure including a contact member arranged to be adjustably settable around said axis by rotary movement of said time setting device.

21. In a combined clock and time switch unit completely settable by the use of a single hand of the operator to perform at least two automatic switch actions at selected different times of day, the combination of, a framework, a circuitous scale of time-of-day markings stationed in relation to said framework, a first arcuate signal chart mounted for rotary adjustive movement relatively to said framework through a range of various settings in visible time signalling relation to said scale, a second arcuate signal chart mounted concentrically with said first chart for rotary adjustive movement through a range of various settings relatively to both said first chart and said framework in cooperative time-signalling register therewith, switch action controlling elements operably connected to said charts respectively in a manner to be stationed variously in different switch timing positions with respect to each other and to said framework in accordance with rotary settings of said charts, separate manuals connected to adjust said charts selectively to their said settings, and a brake arranged cooperatively with at least one of said charts and its said manual in a manner to anchor the same yieldably in relation to said frame with sufficient force to hold said one of said charts and its said connected switch controlling element motionless during rotary adjustive movement of the other said chart within its said range.

22. In a combined clock and time switch unit completely settable by the use of a single hand of the operator to perform at least two automatic switch actions at selected different times of day, the combination defined in claim 21, in which the said brake comprises a spring deriving thrust from the said [frame plate] *framework* and exerting a frictional thrust on at least one of the said manuals.

23. In a combined clock and time switch unit completely settable by the use of a single hand of the operator to perform at least two automatic switch actions at selected different times of day, the combination defined in claim 21, together with a set of meshing gears turnably supported by the said [frame plate] *framework*, one of said gears being connected to impart adjustive rotary movement to one of the said signal charts and the other of said gears being connected to be impelled by one of the said manuals, the said brake comprising a spring under compression between said [frame plate] *framework* and said manually impelled gear.

24. In a combined clock and time switch unit completely settable without regard to sequence by the use of a single hand of the operator to perform at least two automatic switch actions at selected different times of day, the combination of a framework, a circuitous scale of time-of-day markings stationed in relation to said framework, at least two arcuate signal charts one being mounted for rotary adjustive movement through a range of various settings relatively to the other and to said framework in visible time signalling relation to said scale, and the other chart being mounted concentrically with said first chart for rotary adjustive movement through a range of various settings relatively to both said first chart and said [frame work] *framework* in cooperative time-signalling register therewith, switch action controlling elements operably connected to said charts respectively in a manner to be stationed variously in different switch timing positions with respect to each other and to said framework in accordance with rotary settings of said charts, separate manuals connected to adjust said charts selectively to their said settings, and a brake arranged cooperatively with each of said charts and its said manual in a manner to anchor the same yieldably in relation to said [frame] *framework* with sufficient force to hold either of said charts and its said connected switch controlling element motionless during rotary adjustive movement of the other said chart within its said range.

25. In an automatically acting time switch, the combination of a clock hand turnable about an axis of rotation to tell time of day, a frame plate extending transversely of said axis of rotation, a closure panel in front of said frame plate spaced therefrom, a sight window in said closure panel through which said clock hand is visible, concentric arcuate time signalling charts independently movable for cooperative rotary adjustment in mutual register so that one of said charts conceals and exposes various selective portions of the other of said charts, said charts deriving support from said frame plate and being visible through said window, sets of gears deriving support from said frame plate each of said sets of gears being connected to cause independent rotary adjustment of a different one of said charts, at least one of said sets of gears being located between said frame plate and said closure panel and concealed by the latter, and manual controls operatively connected respectively to gears of said sets and extending through said closure panel to be accessible for time setting manipulation at the front of the latter.

*26. In a combined clock and time switch unit completely settable by the use of a single hand of the operator to perform at least two automatic switch actions at selected different times of day, the combination of, a framework, a circuitous scale of time-of-day markings stationed in relation to said framework, a screening disc containing a break in its circular continuity and carrying an index in fixed relation thereto, said disc being mounted for rotary adjustment relative to said framework through a range of circular movement about a pivotal axis thereby to effect various settings of said index in visible time signalling relation to said scale, a graduated disc mounted for rotary adjustive movement about said axis in close face-to-face proximity to said screening disc and mechanically so associated therewith that turning of one of said discs can impart a turning tendency to the other of said discs, said graduated disc carrying a series of time interval indicating marks arcuately spaced about said axis over a sectoral area of said graduated disc traversed by said break in said screening disc whereby said screening disc acts in part to conceal and in part to reveal said time interval indicating marks, switch action controlling elements operably connected to said discs respectively in a manner to be stationed variously in different switch timing positions with respect to each other and to said framework in accordance with rotary settings of said discs, separate setting mechanisms for individually adjusting said discs selectively to their said settings, said mechanisms including respectively separate manuals and respectively separate sets of intermeshed gear teeth operably related to said manuals and turnably supported by said framework, each of said sets of gear teeth being connected to impart adjustive rotary movement to a different one of*

*said discs, and a brake arranged cooperatively between said framework and at least one of said mechanisms in a manner to anchor the latter yieldably in relation to said framework with a force sufficiently strong to overcome said tendency of one of said discs to impart movement to the other said disc.*

*27. In a combined clock and time switch unit completely settable by the use of a single hand of the operator to perform at least two automatic switch actions at selected different times of day, the combination of, a framework, a circuitous scale of time-of-day markings stationed in relation to said framework, a screening disc containing a break in its circular continuity and carrying an index in fixed relation thereto, said disc being mounted for rotary adjustment relative to said framework through a range of circular movement about a pivotal axis thereby to effect various settings of said index in visible time signalling relation to said scale, a graduated disc mounted for rotary adjustive movement about said axis in close face-to-face proximity to said screening disc and mechanically so associated therewith that broadside contact of one of said discs against the other can occur whereby turning of one of said discs can impart a tuning tendency to the other of said discs, said graduated disc carrying a series of time interval indicating marks arcuately spaced about said axis over a sectoral area of said graduated disc traversed by said break in said screening disc whereby said screening disc acts in part to conceal and in part to reveal said time interval indicating marks, switch action controlling elements operably connected to said discs respectively in a manner to be stationed variously in different switch timing positions with respect to each other and to said framework in accordance with rotary settings of said discs, separate setting mechanisms for individually adjusting said discs selectively to their said settings, said mechanisms including respectively separate manuals and respectively separate sets of intermeshed gear teeth operably related to said manuals and turnably supported by said framework, each of said sets of gear teeth being connected to impart adjustive rotary movement to a different one of said discs, and a brake arranged cooperatively between said framework and at least one of said mechanisms in a manner to anchor the latter yieldably in relation to said framework with a force sufficiently strong to overcome said tendency of one of said discs to impart movement to the other said disc.*

*28. In a combined clock and time switch unit completely settable by the use of a single hand of the operator to perform at least two automatic switch actions at selected different times of day, the combination of, a framework, a circuitous scale of time-of-day markings stationed in relation to said framework, a screening disc containing a break in its circular continuity and carrying an index in fixed relation thereto, said disc being mounted for rotary adjustment relative to said framework through a range of circular movement about a pivotal axis thereby to effect various settings of said index in visible time signalling relation to said scale, a graduated disc mounted for rotary adjustive movement about said axis in close face-to-face proximity to said screening disc and mechanically so associated therewith that turning of one of said discs can impart a turning tendency to the other of said discs, said graduated disc carrying a series of time interval indicating marks arcuately spaced about said axis over a sectoral area of said graduated disc traversed by said break in said screening disc whereby said screening disc acts in part to conceal and in part to reveal said time interval indicating marks, switch action controlling elements operably connected to said discs respectively in a manner to be stationed variously in different switch timing positions with respect to each other and to said framework in accordance with rotary settings of said discs, separate setting mechanisms for individually adjusting said discs selectively to their said settings, said mechanisms including respectively separate manuals and respectively seperate sets of intermeshed gear teeth operably related to said manuals and turnably supported by said framework, each of said sets of gear teeth being connected to impart adjustive rotary movement to a different one of said discs and to be movable thereby, and a brake arranged cooperatively between said framework and at elast one of said sets of gear teeth in a manner to anchor the latter yieldably in relation to said framework with a force sufficiently strong to overcome said tendency of one of said discs to impart movement to the other said disc.*

*29. In a combined clock and time switch unit completely settable by the use of a single hand of the operator to perform at least two automatic switch actions at selected different times of day, the combination of, a framework, a circuitous scale of time-of-day markings stationed in relation to said framework, a screening disc containing a break in its circular continuity and carrying an index in fixed relation thereto, said disc being mounted for rotary adjustment relative to said framework through a range of circular movement about a pivotal axis thereby to effect various settings of said index in visible time signalling relation to said scale, a graduated disc mounted for rotary adjustive movement about said axis in close face-to-face proximity to said screening disc and mechanically so associated therewith that broadside contact of one of said discs against the other can occur whereby turning of one of said discs can impart a turning tendency to the other of said discs, said graduated disc carrying a series of time interval indicating marks arcuately spaced about said axis over a sectoral area of said graduated disc traversed by said break in said screening disc whereby said screening disc acts in part to conceal and in part to reveal said time interval indicating marks, switch action controlling elements operably connected to said discs respectively in a manner to be stationed variously in different switch timing positions with respect to each other and to said framework in accordance with rotary settings of said discs, separate setting mechanisms for individually adjusting said discs selectively to their said settings, said mechanisms including respectively separate manuals and respectively separate sets of intermeshed gear teeth operably related to said manuals and turnably supported by said framework, each of said sets of gear teeth being connected to impart adjustive rotary movement to a different one of said discs and to be movable thereby, and a brake arranged cooperatively between said framework and at least one of said sets of gear teeth in a manner to anchor the latter yieldably in relation to said framework with a force sufficiently strong to overcome said tendency of one of said discs to impart movement to the other said disc.*

*30. In a combined clock mechanism and time switch unit completely settable by the use of a*

*single hand of the operator to perform at least two automatic switch actions at selected different times of day, the combination of, a framework, a time wheel continually driven by clock mechanism to rotate about a fixed axis, a circuitous scale of time-of-day markings stationed in relation to said framework, a first arcuate signal chart mounted for rotary adjustive movement about said axis relative to said framework through a range of various settings in visible time signalling relation to said scale, a second arcuate signal chart mounted concentrically with said first chart for rotary adjustive movement about said axis through a range of various settings relative to both said first chart and said framework in cooperative time-signalling register therewith, switch action controlling elements respectively fixed in relation to said charts and arranged to be stationed variously in wipable relation to said time wheel in different switch timing positions of said charts with respect to each other and to said framework in accordance with rotary settings of said charts, separate manuals connected to adjust said charts selectively to their said settings, and a brake arranged cooperatively with at least one of said charts and its said manual in a manner to anchor the same yieldably in relation to said frame with sufficient force to hold said one of said charts and its said connected switch controlling element motionless while being wiped by said time wheel during rotation of the latter and during rotary adjustive movement of the other said chart within its said range.*

*31. In a combined clock mechanism and time switch unit completely settable by the use of a single hand of the operator to perform at least two automatic switch actions at selected different times of day, the combination defined in claim 30, in which the said time wheel carries a camming device, and the said switch action controlling elements are stationed in the path of rotation of said camming device so as to be wiped frictionally by the latter in a manner tending to drag said elements around said axis with said time wheel.*

*32. In a combined clock mechanism and time switch unit completely settable by the use of a single hand of the operator to perform at least two automatic switch actions at selected different times of day, the combination defined in claim 30, in which the said time wheel carries a camming surface disposed in oblique relation to the said axis of rotation of the time wheel, and the said switch action controlling elements are stationed in the path of rotation of said camming surface so as to be wiped frictionally by the latter in a manner tending to drag said elements around said axis with said time wheel.*

RAYMOND D. SMITH.

References Cited in the file of this patent or the original patent

UNITED STATES PATENTS

| Number | Name | Date |
|---|---|---|
| Re. 22,570 | Lux | Nov. 28, 1944 |
| 1,180,420 | Parker | Apr. 25, 1916 |
| 1,563,072 | Brenneman | Nov. 24, 1925 |
| 1,633,870 | Potter | June 28, 1927 |
| 2,004,137 | Smith | June 11, 1935 |
| 2,032,774 | Smith | Mar. 3, 1936 |
| 2,124,045 | Swensen | July 19, 1938 |
| 2,249,237 | Fulton | July 15, 1941 |
| 2,288,539 | Morrison | June 30, 1942 |
| 2,310,527 | Hutt | Feb. 9, 1943 |
| 2,361,262 | Candor | Oct. 24, 1944 |